United States Patent
Segawa

(10) Patent No.: US 11,679,770 B2
(45) Date of Patent: Jun. 20, 2023

(54) CONTROL SYSTEM FOR DETERMINING ROAD SURFACE CONDITION

(71) Applicant: TOYOTA JIDOSHA KABUSHIKI KAISHA, Toyota (JP)

(72) Inventor: Taku Segawa, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/673,356

(22) Filed: Feb. 16, 2022

(65) Prior Publication Data
US 2022/0266836 A1    Aug. 25, 2022

(30) Foreign Application Priority Data
Feb. 22, 2021   (JP) .............................. JP2021-026022

(51) Int. Cl.
*B60W 40/06*      (2012.01)
*B60W 50/00*      (2006.01)
*G06N 20/00*      (2019.01)

(52) U.S. Cl.
CPC ............. *B60W 40/06* (2013.01); *G06N 20/00* (2019.01); *B60W 2510/104* (2013.01); *B60W 2510/1005* (2013.01); *B60W 2520/105* (2013.01); *B60W 2520/125* (2013.01); *B60W 2520/28* (2013.01); *B60W 2540/10* (2013.01); *B60W 2552/05* (2020.02); *B60W 2552/35* (2020.02); *B60W 2556/45* (2020.02)

(58) Field of Classification Search
CPC ......... B60W 40/06; B60W 2510/1005; B60W 2510/104; B60W 2520/105; B60W 2520/125; B60W 2520/28; B60W 2540/10; B60W 2552/05; G06N 3/0454; G06N 20/00
See application file for complete search history.

(56) References Cited

U.S. PATENT DOCUMENTS

| | | | |
|---|---|---|---|
| 2019/0212138 A1* | 7/2019 | Hanatsuka | ............. G01B 17/08 |
| 2019/0376811 A1* | 12/2019 | Roy Chowdhury | ......................... B60W 40/068 |
| 2020/0114922 A1* | 4/2020 | Tokumitsu | ....... B60W 30/18172 |
| 2020/0380185 A1* | 12/2020 | Hanatsuka | ............ B60C 23/065 |
| 2022/0063630 A1* | 3/2022 | Park | ..................... G05B 13/027 |
| 2022/0234590 A1* | 7/2022 | Laruelo | ............... B60W 40/064 |

FOREIGN PATENT DOCUMENTS

| | | | | |
|---|---|---|---|---|
| EP | 2871629 A1 * | 5/2015 | ......... | G06K 9/00791 |
| JP | 2008-213684 A | 9/2008 | | |
| KR | 102173797 A * | 11/2020 | ............. | G06F 17/18 |
| WO | WO-2015014619 A1 * | 2/2015 | ............. | F16H 59/54 |
| WO | WO-2018003366 A1 * | 1/2018 | ............. | B60C 19/00 |

* cited by examiner

*Primary Examiner* — Tisha D Lewis
(74) *Attorney, Agent, or Firm* — Dinsmore & Shohl LLP

(57) ABSTRACT

A control system configured to accurately determine a condition of a road surface on which a vehicle travels. A learned model estimates the road surface condition based on the travelling data collected during propulsion of the vehicle, and a controller determines the road surface condition based on the road surface condition estimated by the learned model.

17 Claims, 5 Drawing Sheets

CONTROL SYSTEM FOR DETERMINING ROAD SURFACE CONDITION

CROSS-REFERENCE TO RELATED APPLICATIONS

The present disclosure claims the benefit of Japanese Patent Application No. 2021-026022 filed on Feb. 22, 2021 with the Japanese Patent Office.

BACKGROUND

Technical Field

Embodiments of the present disclosure relate to the art of a vehicular control system configured to automatically determine a surface condition of a road on which a vehicle travels.

Discussion of the Related Art

JP-A-2008-213684 describes a vehicle travelling road determination device configured to determine whether a vehicle is travelling on a paved road or a sandy road. According to the teachings of JP-A-2008-213684, specifically, a presumed angular acceleration of a wheel (i.e., a presumed acceleration) is obtained based on an engine speed and a gear ratio of a transmission, and an actual angular acceleration of the wheel (i.e., an actual acceleration) is obtained based on a detection value of an acceleration sensor. Thereafter, a current road surface condition is determined based on a difference between the angular acceleration and the actual acceleration. However, the presumed angular acceleration is changed due to aging deterioration of the vehicle, and depending of a kind of fuel. According to the teachings of JP-A-2008-213684, therefore, the determination device is configured to obtain an error rate between an average value of the presumed acceleration and an average value of the actual acceleration when the vehicle propelled at a speed higher than a predetermined value and an angular acceleration of the wheel is slower than a predetermined value. Thereafter, the determination device corrects the presumed acceleration by the error rate, and determines a current road surface condition based on the presumed acceleration thus corrected and the actual acceleration.

Thus, the determination device taught by JP-A-2008-213684 determines whether the vehicle travels on a paved road or sandy road based on the presumed acceleration corrected by the error rate and the actual acceleration. However, a feature of a road surfaced and a period in which the feature of the road surface appears would change on e.g., a muddy road and a rocky road. For this reason, a road surface condition may not be determined accurately based only on the difference between the presumed acceleration and the actual acceleration if the vehicle travels on a road other than the paved road and the sandy road.

SUMMARY

Aspects of embodiments of the present disclosure have been conceived noting the foregoing technical problems, and it is therefore an object of the present disclosure to provide a control system configured to accurately determine a condition of a road surface on which a vehicle travels.

The exemplary embodiment of the present disclosure relates to a control system that determines a road surface condition based on travelling data collected during propulsion of a vehicle, comprising: a controller that determines the road surface condition on which the vehicle travels; and a learned model that has been built in advance based on the travelling data. In order to achieve the above-explained objective, according to the exemplary embodiment of the present disclosure, the learned model is configured to estimate the road surface condition based on the travelling data collected during propulsion of the vehicle. In addition, the controller is configured to determine the road surface condition based on the road surface condition estimated by the learned model.

In a non-limiting embodiment, the learned model may be built by a supervised learning using, as training data, the travelling data which has been collected during test driving and data corresponding to the road surface condition on which the test driving was conducted.

In a non-limiting embodiment, the learned model may be stored in the controller.

In a non-limiting embodiment, the controller may comprise: a transmitter that transmits the travelling data to an external device; and a receiver that receives the road surface condition estimated by the learned model stored in the external device. In addition, the controller may be further configured to determine the road surface condition based on the estimated road surface condition transmitted to the receiver from the external device.

In a non-limiting embodiment, the travelling data may include at least one of a lateral acceleration of the vehicle, a longitudinal acceleration of the vehicle, a rotational speed of a wheel of the vehicle, and an angular acceleration of the wheel of the vehicle.

In a non-limiting embodiment, the travelling data may include operational data relating to an operating amount of an operating device of the vehicle.

In a non-limiting embodiment, the operational data may include at least one of an operating amount of an accelerator pedal and an estimated longitudinal acceleration of the vehicle.

In a non-limiting embodiment, the vehicle comprises a mode changer that shift a shifting mode between: a low mode in which a speed ratio between a prime mover and drive wheels is relatively large; and a high mode in which the speed ratio is smaller than the speed ratio in the low mode.

In a non-limiting embodiment, the operational data may further include the shifting mode established by the mode changer.

In a non-limiting embodiment, the learned model may include a plurality of learned models built based on the travelling data collected in the low mode and based on the travelling data collected in the high mode.

In a non-limiting embodiment, the learned model may be configured to determine the road surface condition based on the operational data and the travelling data collected within a predetermined period of time during propulsion of the vehicle. In addition, the predetermined period of time in the low mode may be set longer than the predetermined period of time in the high mode.

In a non-limiting embodiment, the road surface condition may include a muddy road, a sandy road, a paved road, and a rocky road.

Thus, according to the exemplary embodiment of the present disclosure, the road surface condition is estimated by the learned model based on the travelling data collected during propulsion of the vehicle, and then the road surface condition is determined based on the estimated road surface condition. According to the exemplary embodiment of the present disclosure, therefore, the road surface condition may be determined accurately even if the road surface condition changes frequently and even if the vehicle travels on e.g., a rocky road which takes longer time to be determined.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE EMBODIMENT(S)

Figure 1:
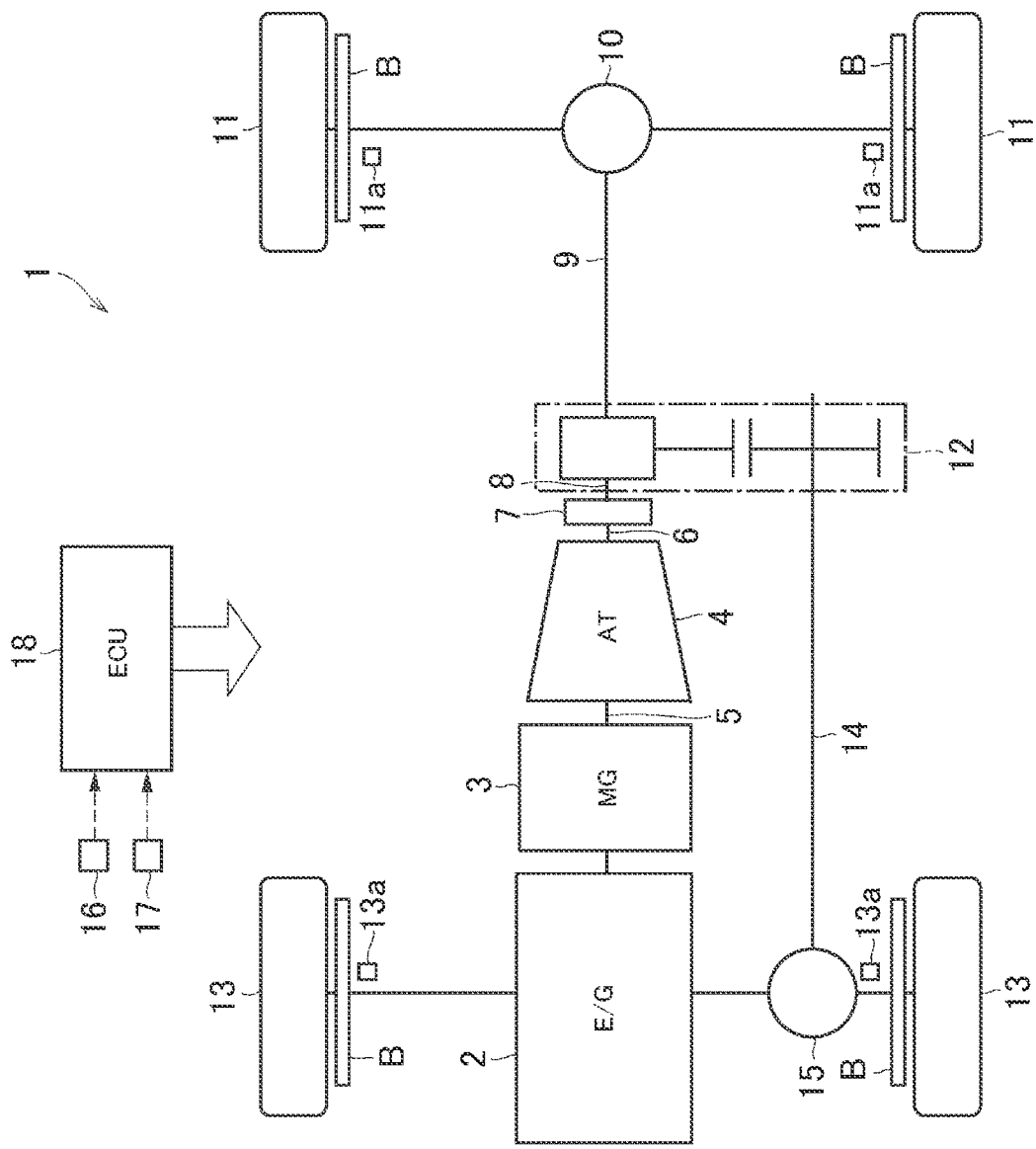
FIG. 1 is a schematic illustration showing a structure of a vehicle to which the control system according to the exemplary embodiment of the present disclosure is applied.

An exemplary embodiment of the present disclosure will now be explained with reference to the accompanying drawings. Referring now to FIG. 1, there is shown one example of a structure of a hybrid vehicle (as will be simply called the "vehicle" hereinafter) Ve in which a prime mover includes an engine 2 (referred to as "E/G" in FIG. 1) and a motor 3. The vehicle 1 is a front-engine/rear-drive layout four-wheel drive vehicle in which the engine 2 is arranged in a front section of the vehicle 1. In the vehicle 1, a motor (referred to as "MG" in FIG. 1) 3 and an automatic transmission (referred to as "A/T" in FIG. 1) 4 are arranged downstream of the engine 2. Specifically, an output shaft of the engine 2 and a rotor shaft of the first motor 3 are connected to an input shaft 5 of the automatic transmission (as will be simply called the "transmission" hereinafter) 4. As an option, in order to damp torsional vibrations resulting from pulsation of torque of the engine 2, at least one of a spring damper and a torque converter (or a fluid coupling) may be interposed between the engine 2 and the motor 3, or between the engine 2 and the transmission 4. In addition, in order to selectively interrupt torque transmission between the engine 2 and the motor 3, a launching clutch may be interposed between the engine 2 and the motor 3.

For example, a gasoline engine and a diesel engine may be adopted as the engine 1, and an output torque of the engine 1 is changed by controlling a fuel injection in accordance with a position of an accelerator pedal (not shown). When the engine 1 is rotated passively while stopping a fuel supply thereto, a brake force derived from a friction torque and a pumping loss is applied to the output shaft of the engine 1. On the other hand, a motor-generator having a generating function such as a permanent magnet synchronous motor is adopted as the motor 3.

In the vehicle 1 shown in FIG. 1, a geared automatic transmission is adopted as the transmission 4. The transmission 4 comprises a plurality of engagement devices such as clutches and brakes, and a gear stage of the transmission 4 is shifted among a plurality of stages by manipulating the engagement devices in accordance with a position of the accelerator pedal and a speed of the vehicle 1. Instead, a belt-driven continuously variable transmission in which a speed ratio is varied continuously by changing an effective running diameter of a belt, and a toroidal continuously variable transmission in which a speed ratio is varied continuously by changing an inclination angle of a power roller may also be adopted as the transmission 4. Further, an electric continuously variable transmission that varies a speed ratio between the input shaft 5 and an output shaft 6 continuously may also be adopted as the transmission 4. In this case, another motor, the input shaft 5, and the output shaft 6 are connected to one another in a differential manner, and the speed ratio between the input shaft 5 and an output shaft 6 is varied by controlling another motor.

The output shaft 6 of the transmission 4 is connected to a sub-transmission 7 as a mode changer that shifts a shifting mode between a low mode in which a speed ratio is relatively large and a high mode in which a speed ratio is smaller than the low mode. The shifting mode may be selected manually by operating a dedicated lever to operate the sub-transmission 7. For example, when climbing a steep slope or when travelling on a rocky road, it is expected that a driver selects a low mode to establish a large driving force. Whereas, when the high mode is selected, a fixed stage may be established by the sub-transmission 7 to fix a speed ratio of between the output shaft 6 of the transmission 4 and an output shaft 8 of the sub-transmission 7 to 1.

The output shaft 8 of the sub-transmission 7 is connected to a rear differential gear unit 10 through a rear propeller shaft 9 so that a drive torque is distributed from the rear differential gear unit 10 to a pair of rear wheels 11. In order to detect speeds of the rear wheels 11, each of the rear wheels 11 is individually provided with a wheel speed sensor 11a.

A transfer 12 is disposed downstream of the sub-transmission 7 so as to deliver output torque of the sub-transmission 7 partially to a pair of front wheels 13 to propel the vehicle 1 in a four-wheel drive mode. To this end, the transfer 12 is connected to a front differential gear unit 15 through a front propeller shaft 14 so that the torque is distributed from the front differential gear unit 15 to the front wheels 13. In order to detect speeds of the front wheels 13, each of the front wheels 13 is individually provided with a wheel speed sensor 13a.

For example, the transfer 12 may be a part-time transfer including a clutch (not shown) that selectively interrupt torque transmission to a gear train for delivering the torque to the front propeller shaft 14, a full-time transfer that always distributes the torque to the front wheels 13 and the rear wheels 11 while allowing a differential rotation between the front wheels 13 and the rear wheels 11, or a full-time transfer that can selectively restrict a differential rotation between the front wheels 13 and the rear wheels 11.

Each of the front wheels 13 and the rear wheels 11 is further provided with a brake B so that braking torques applied to the front wheels 13 and the rear wheels 11 may be controlled separately. For example, the braking torques applied to the front wheels 13 and the rear wheels 11 will be controlled separately in the event of activation of a Vehicle Stability Control System (VSC) that prevents a skid of the braked wheel, a Traction Control System (TRC) that prevents a slip of the braked wheel, or an Anti-lock Brake System (ABS) that prevents a locking up of the braked wheel.

For example, a limited-slip differential gear unit (LSD) adapted to restrict differential rotation between a right wheel and a left wheel may be employed as the front differential gear unit 15 and the rear differential gear unit 10, respectively. Given that the limited-slip differential gear units are employed as the front differential gear unit 15 and the rear differential gear unit 10, a torque distribution ratio to the right wheel and the left wheel may be varied arbitrarily in each pair of the front wheels 13 and the rear wheels 11.

In the vehicle 1, distribution ratios and control amounts of the driving torque and the braking torque delivered to the front wheels 13 and the rear wheels 11 may be controlled depending on the road surface condition by turning on a control switch 16. In addition, in the vehicle 1, the current road surface condition may be selected manually by operating a selector switch 17 so that distribution ratios and control amounts of the driving torque and the braking torque can be controlled in accordance with the selected road surface condition.

Figure 2:
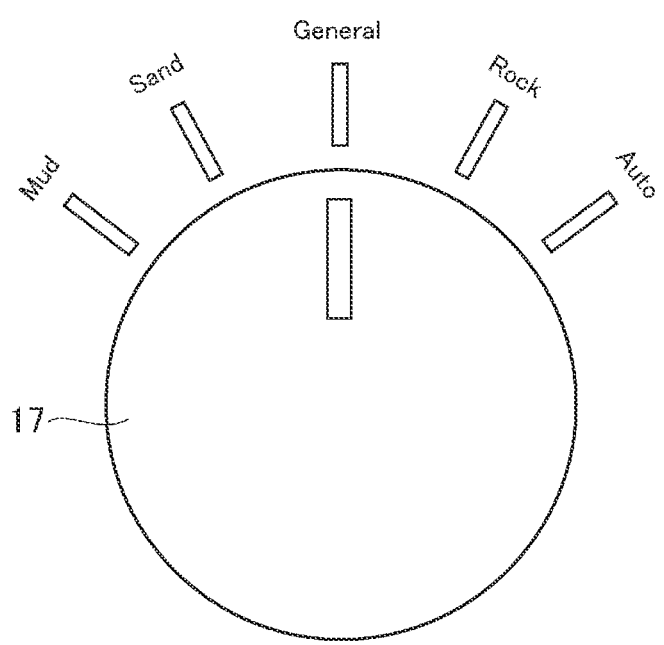
FIG. 2 is a schematic illustration showing one example of a selector switch.

Turning to FIG. 2, there is shown one example of a structure of the selector switch 17. As illustrated in FIG. 2, a road surface condition may be selected by rotating a knob of the selector switch 17 from a muddy road, a sandy road, a paved road (referred to as "General" in FIG. 2), and a rocky road. In addition, an automatic mode in which the road surface condition is determined automatically can be selected by rotating the knob to an automatic position. However, a device for selecting the road surface condition should not be limited to the selector switch 17. For example, the road surface condition may be indicated in a touch panel, and the road surface condition as well as the automatic mode may be selected by operating the touch panel.

The control system according to the exemplary embodiment is configured to automatically determine a current road surface condition during propulsion in the automatic mode.

Figure 3:
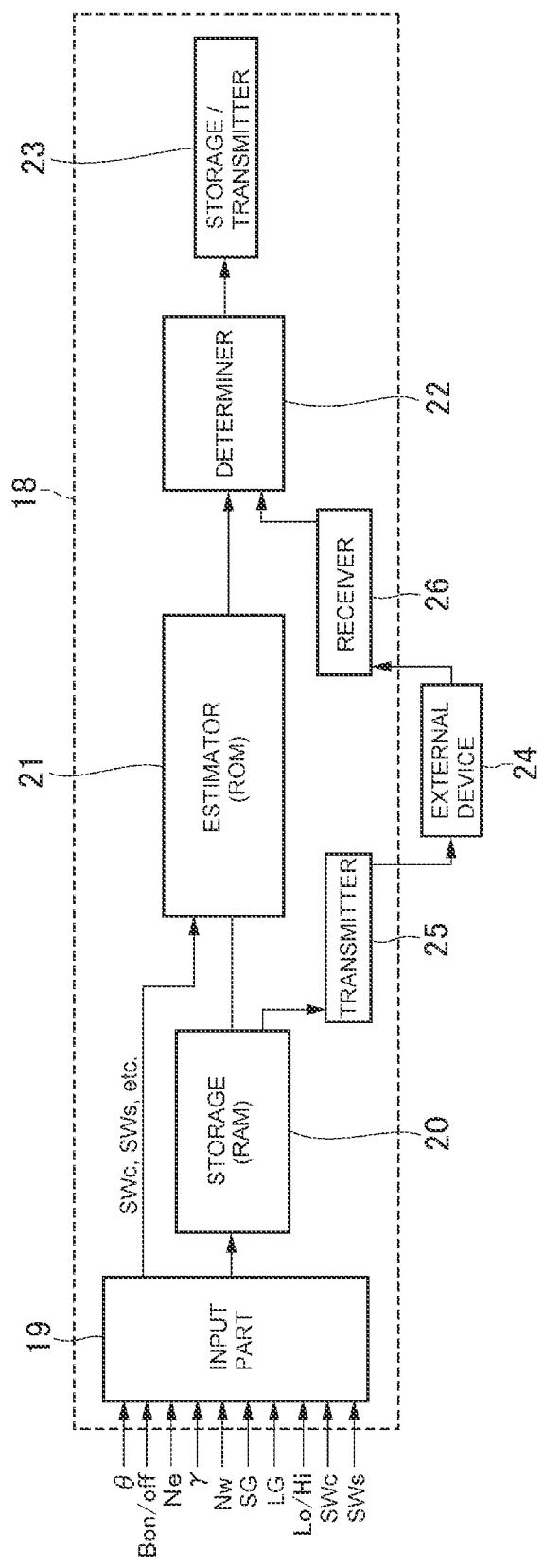
FIG. 3 is a block diagram showing a structure of an electric control unit.

Turning to FIG. 3, there is shown one example of a structure of an electronic control unit (to be abbreviated as "ECU" hereinafter) 18 as a controller that determines a road surface condition. In addition, the engine 2, the motor 3, the transfer 12 and so on are also controlled by the ECU 18.

The ECU 18 comprises a microcomputer as its main constituent including a ROM storing maps and formulas prepared based on experimental outcomes, and a RAM temporarily storing travelling data and so on.

Specifically, the ECU 18 comprises: an input part 19 that receives data transmitted from various sensors arranged in the vehicle 1; a storage 20 that stores part of the data transmitted to the input part 19; an estimator 21 that stores a learned model used to determine a road surface condition based on the data transmitted from the input part 19 and the storage 20; a determiner 22 that determines a road surface condition based on the data transmitted from the estimator 21; and a storage/transmitter 23 that stores a signal representing a determined road surface condition in the RAM or that uses the determined road surface condition during execution of another control flow.

The ECU 18 further comprises: a transmitter 25 that transmits the data stored in the storage 20 to an external device 24 such as an external server and an external cloud storage; and a receiver 26 that receives the data from the transmitter 25.

As shown in FIG. 3, for example, the input part 19 receives data relating to: a position (or operating amount) θ of the accelerator pedal; an on/off signal of the brake B; a speed Ne of the engine 2; a gear stage (or speed ratio) y of the transmission 4; rotational speeds Nw of the front wheels 13 and the rear wheels 11; a lateral acceleration SG of the vehicle 1; a longitudinal acceleration LG of the vehicle 1; the shifting mode Lo/Hi of the sub-transmission 7; an output signal SWc of the control switch 16; and an output signal SWs of the selector switch 17. Thus, the data about parameters strongly related to the road surface condition is collected by the sensors, and the collected data is sent to the input part 19.

Specifically, the storage 20 comprises a RAM so that the data within a predetermined period of time transmitted from the input part 19 is temporarily stored in the storage 20. In addition, the input part 19 or the storage 20 has a data conversion feature. Specifically, the input part 19 or the storage 20 calculates drive torques delivered to the front wheels 13 and the rear wheels 11 based on a position of the accelerator pedal, a gear stage of the transmission 4, and a shifting mode of the sub-transmission 7, and thereafter calculates an estimate value of a longitudinal acceleration of the vehicle 1 based on the calculated drive torques. The estimate value of the longitudinal acceleration of the vehicle 1 is stored in the storage 20. The input part 19 or the storage 20 also calculates angular accelerations of the front wheels 13 and the rear wheels 11 by differentiating rotational speeds of the front wheels 13 and the rear wheels 11, and the calculated angular accelerations are also stored in the storage 20. For example, the storage 20 starts storing the data from a point at which the control switch 16 is turned on or a point at which a main switch (not shown) of the vehicle 1 is turned on.

The estimator 21 in which the learned model is stored serves as an artificial intelligence to determine a road surface condition utilizing e.g., convolutional neural networks (CNN).

In order to build the learned model, a test driving was conducted using a test vehicle having a similar structure as the vehicle 1, on various kinds of roads to collect data relating to a position of the selector switch 17 selected by a driver during propulsion on a tested road surface condition. The collected data about the selected position of the selector switch 17 on each tested condition was sent to a model building device of a test vehicle to build the learned model utilizing the data about the selected position as correct labels.

In addition, travelling data including the data detected by the sensors and data relating to details of operations during the test driving is associated with the correct labels. Specifically, the travelling data associated with the correct labels includes a lateral acceleration of the test vehicle, a longitudinal acceleration of the test vehicle, speeds and angular accelerations of the front wheels 13 and the rear wheels 11, a position of the accelerator pedal, on/off signals of the brakes B, an estimated longitudinal acceleration of the test vehicle and so on.

An accuracy of the determination of the road surface condition is improved by increasing a period of time to collect the travelling data to be used in the machine learning. Therefore, in order to obtain a suitable period of time percentage to make a correct determination of the road surface conditions, the collected data was sorted according to a period of time in which the data was collected. For example, the collected data was sorted into data collected for five seconds, data collected for six seconds, and data collected for seven seconds, and features of the road surface conditions was learnt based on the data collected within each period of time. To this end, optionally, the collected data may be further sorted on the time axis into a first travelling data collected for a predetermined period of time and a second travelling data collected for another period of time.

For example, data collected for a predetermined period of time from a first point of time to a second point of time may be sorted as the first travelling data, and data collected for another period of time from a third point of time after the first point of time but before the second point of time to a fourth period of time was sorted as the second travelling data.

A part of the data thus sorted was used as a training data and another travelling data was used as a test data to learn the features of the road surface conditions utilizing the convolutional neural networks. To this end, positions of the selector switch 17 selected by the test driver was used as the correct labels. That is, the learned model is built for each period of time to collect the travelling data, by the supervised learning using the collected travelling data and a selected position of the selector switch 17 as the training data.

Figure 4:
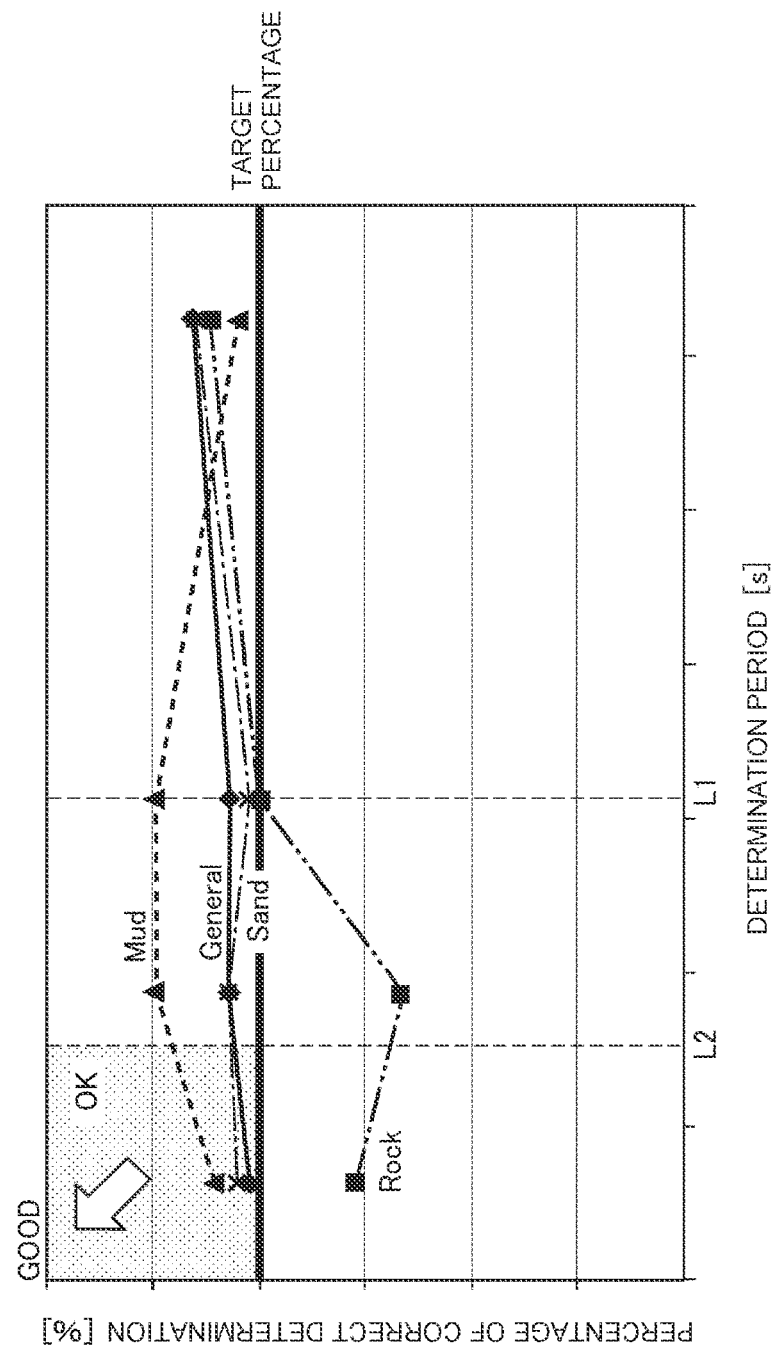
FIG. 4 is a graph showing percentages of correct determinations of the road surface conditions using the learned model.

Turing to FIG. 4, there are shown percentages of correct determinations of the road surface conditions using the learned model thus built. In FIG. 4, the horizontal axis represents a period of time to collect the travelling data used to determine the road surface condition (i.e., a determination period), and the vertical axis represents a percentage of correct determinations, the solid curve represents a percentage of correct determinations of the paved road, the dashed curve represents a percentage of correct determinations of the muddy road, the dashed-dotted curve represents a percentage of correct determinations of the sandy road, and the two-dotted-dashed curve represents a percentage of correct determinations of the rocky road.

As can be seen from FIG. 4, the percentages of correct determinations of the paved road, the muddy road, and the sandy road are higher than a target percentage even if the determination period is short. Whereas, the percentage of correct determinations of the rocky road drops abruptly within a period shorter than a first period of time L1. This is because unevenness of the rocky road changes at every moment unlike the paved road, the muddy road, and the sandy road, and hence it will take longer time to capture the feature of the rocky road. In addition, on the rocky road, the vehicle has to be propelled at an extremely low speed in the low mode of the sub-transmission 7, therefore, it will take longer time to capture the feature of the rocky road.

According to the exemplary embodiment of the present disclosure, therefore, two kinds of learned models were built based on the travelling data collected in the low mode and based on the travelling data collected in the high mode. Specifically, one of the learned models was built based on the travelling data collected in a period longer than the first period of time L1 to be used in the low mode, and the other one of the learned models was built based on the travelling data collected in a period shorter than the first period of time L1 to be used in the high mode. Here, those learned model may be unified to determine the road surface condition based on the shifting mode of the sub-transmission 7 transmitted to the input part 19.

As described, the learned model(s) thus built is/are stored in the estimator 21. The road surface condition estimated by the estimator 21 based on the learned model is sent to the determiner 22, and the road surface condition is determined by the determiner 22. The road surface condition determined by the determiner 22 is stored in the RAM of the storage/transmitter 23, or transmitted to devices for controlling behavior of the vehicle 1 in accordance with the road surface condition.

Instead, the learned model may also be stored in the external device 24, and the traveling data may also be sent from the transmitter 25 to the external device 24. In this case, the road surface condition will be estimated by the external device 24, and signal representing the road surface condition estimated by the external device 24 is transmitted to the receiver 26. The signal representing the road surface condition estimated by the external device 24 is further transmitted to the determiner 22 to determine the road surface condition.

Figure 5:
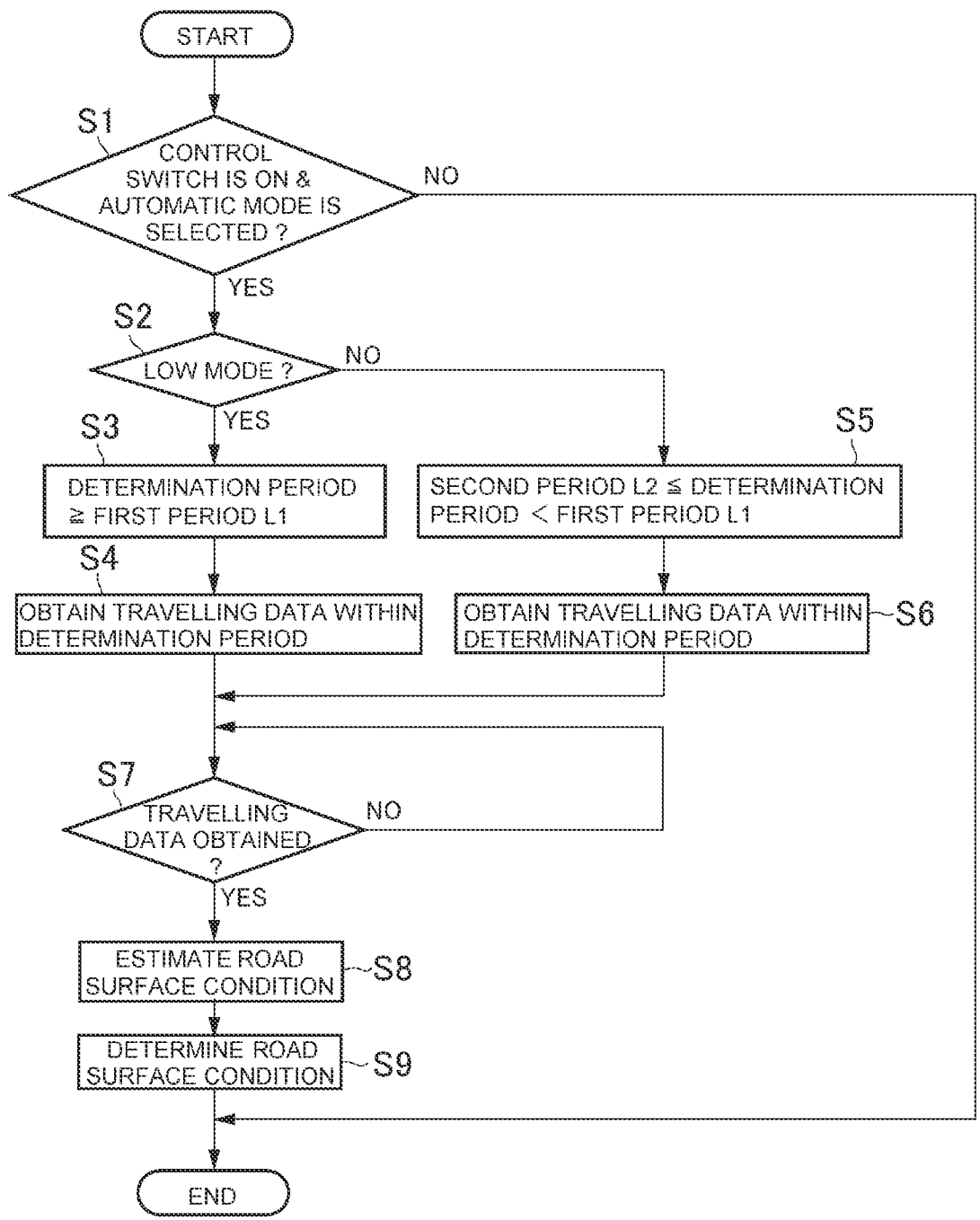
FIG. 5 is a flowchart showing a routine executed by the control system according to the exemplary embodiment of the present disclosure.

Next, an example of a routine for determining the road surface condition will be explained with reference to FIG. 5. At step S1, it is determined whether the control switch 16 is turned on and the selector switch 17 is turned to the automatic position to select the automatic mode. Specifically, such determination at step S1 may be made based on the signals transmitted from the control switch 16 and the selector switch 17 to the input part 19.

If the control switch 16 is turned off and the selector switch 17 is not turned to the automatic position so that the answer of step S1 is NO, the routine returns. In this case, if the control switch 16 is off, the driving force to propel the vehicle 1 is controlled in accordance with an operation of the accelerator pedal without changing the torque distribution ratio depending on the road surface condition. Whereas, if a specific road surface condition is selected manually by the selector switch 17, the torque distribution ratio is changed in accordance with the position of the selector switch 17.

By contrast, if the control switch 16 is turned on and the selector switch 17 is turned to the automatic position so that the answer of step S1 is YES, the routine progresses to step S2 to determine whether the low mode is established by the sub-transmission 7. Specifically, such determination at step S2 may be made based on the signal (i.e., the Lo/Hi signal) transmitted from the sub-transmission 7 to the input part 19.

If the low mode is established by the sub-transmission 7 so that the answer of step S2 is YES, the routine progresses to step S3 to set the determination period to the first period of time L1 or longer. That is, the determination period to send the travelling data for determining the road surface condition to the learned model is set to the first period of time L1 or longer thereby increasing the percentage of correct determinations of the rocky road to the target percentage or higher. At step S3, specifically, the determination period is set to a period identical to the period of time to collect the travelling data to build the learned model used in the low mode of the sub-transmission 7. Then, the routine progresses to step S4 to obtain the travelling data collected during the period of time set at step S3 from the storage 20.

By contrast, if the high mode is established by the sub-transmission 7 so that the answer of step S2 is NO, the routine progresses to step S5 to set the determination period to a second period of time L2 or longer but shorter than the first period of time L1. For example, the second period of time L2 may be set to a shortest period of time to determine the road surface condition most promptly. At step S5, specifically, the determination period is set to a period identical to the period of time to collect the travelling data to build the learned model used in the high mode of the sub-transmission 7. Then, the routine progresses to step S6 to obtain the travelling data collected during the period of time set at step S5 from the storage 20.

Then, it is determined at step S7 whether the travelling data during the period of time set at step S3 or S5 has been collected. Specifically, in the case that the low mode is established by the sub-transmission 7, it is determined whether the travelling data has been collected during the period set at step S3. Whereas, in the case that the high mode is established by the sub-transmission 7, it is determined whether the travelling data has been collected during the period set at step S5.

For example, the traveling data may not be collected throughout the period of time set at step S3 or S5 immediately after turning on the control switch 16 or the main switch. If the travelling data during the period of time set at step S3 or S5 has not yet been collected so that the answer of step S7 is NO, the routine returns to step S7 until the travelling data during the period of time set at step S3 or S5 is collected.

By contrast, if the travelling data during the period of time set at step S3 or S5 has been collected so that the answer of step S7 is YES, the routine progresses to step S8 to estimate the road surface condition by transmitting the collected travelling data to the learned model. Given that two kinds of the learned models were built based on the travelling data collected in the low mode and the high mode, the learned model built based on the travelling data collected in the current shifting mode of the sub-transmission 7 is selected, and the collected travelling data is inputted to the selected learned model. Whereas, given that the learned model was configured to determine the road surface condition based on the shifting mode of the sub-transmission 7, the current shifting mode of the sub-transmission 7 is inputted to the learned model in addition to the collected travelling data.

Thereafter, at step S9, the road surface condition is determined by the determiner 22 based on the estimated road surface condition, and the routine returns.

Given that the learned model is stored in the external device 24, the travelling data collected during the period of time set at step S3 or S5 is transmitted from the transmitter 25 to the external device 24 after the completion of collection of the traveling data is determined at step S7. Then, the road surface condition is estimated at step S8 by the external device 24, and the estimate road surface condition is transmitted to the determiner 22 through the receiver 26 to determine the road surface condition at step S9.

Thus, according to the exemplary embodiment of the present disclosure, the road surface condition is determined utilizing the learned model. According to the exemplary embodiment of the present disclosure, therefore, the road surface condition may be determined accurately even if the road surface condition changes frequently and even if the vehicle 1 travels on a rocky road which takes longer time to be determined. In addition, the determination period is changed depending on the shifting mode of the sub-transmission 7. According to the exemplary embodiment of the present disclosure, therefore, percentages of correct determinations of the road surface condition may be increased higher than the target percentage. Further, when the vehicle 1 is propelled in the high mode, the period of time to collect the travelling data is reduced shorter than that in the low mode. In this case, therefore, the road surface condition may be determined more promptly during propulsion in the high mode.

Although the above exemplary embodiment of the present disclosure has been described, it will be understood by those skilled in the art that the present disclosure should not be limited to the described exemplary embodiments, and various changes and modifications can be made within the scope of the present disclosure. For example, the learned model may be built further based on a speed and a vertical acceleration of the vehicle. In addition, since the road surface condition may also be determined based on the travelling data collected during coasting, a position of the accelerator pedal may be omitted to build the learned model.

The control system according to the exemplary embodiment of the present disclosure may also be applied to front-drive layout vehicles and rear-drive layout vehicles. Further, the control system according to the exemplary embodiment of the present disclosure may also be applied to vehicles propelled only by an engine, and electric vehicles having one or more motor(s) serving as a prime mover. Furthermore, the sub-transmission may be omitted. In this case, the determination period may be increased when a gear stage lower than a predetermined stage is established by the geared transmission, compared the determination period set when a gear stage higher than the predetermined stage is established by the geared transmission. That is, the automatic transmission will serve as the mode changer in this case.

What is claimed is:

1. A control system that determines a road surface condition based on travelling data collected during propulsion of a vehicle, comprising:
   a controller that determines the road surface condition on which the vehicle travels;
   a mode changer that shift a shifting mode between:
      a low mode in which a speed ratio between a prime mover and drive wheels is relatively large; and
      a high mode in which the speed ratio is smaller than the speed ratio in the low mode; and
   a learned model that has been built in advance based on the travelling data, the learned model includes a plurality of learned models built based on the travelling data collected in the low mode and based on the travelling data collected in the high mode,
   wherein the learned model is configured to estimate the road surface condition based on the travelling data collected during propulsion of the vehicle, the travelling data includes operational data relating to an operating amount of an operating device of the vehicle, and
   the controller is configured to determine the road surface condition based on the road surface condition estimated by the learned model.

2. The control system as claimed in claim 1, wherein the learned model was built by a supervised learning using, as training data, the travelling data which has been collected during test driving and data corresponding to the road surface condition on which the test driving was conducted.

3. The control system as claimed in claim 1, wherein the learned model is stored in the controller.

4. The control system as claimed in claim 1,
   wherein the controller comprises
      a transmitter that transmits the travelling data to an external device, and
      a receiver that receives the road surface condition estimated by the learned model stored in the external device, and
   the controller is further configured to determine the road surface condition based on the estimated road surface condition transmitted to the receiver from the external device.

5. The control system as claimed in claim 1, wherein the travelling data includes at least one of a lateral acceleration of the vehicle, a longitudinal acceleration of the vehicle, a rotational speed of a wheel of the vehicle, and an angular acceleration of the wheel of the vehicle.

6. The control system as claimed in claim 1, wherein the operational data includes at least one of an operating amount of an accelerator pedal and an estimated longitudinal acceleration of the vehicle.

7. The control system as claimed in claim 1, wherein the operational data further includes the shifting mode established by the mode changer.

8. The control system as claimed in claim 1,
wherein the learned model is configured to determine the road surface condition based on the operational data and the travelling data collected within a predetermined period of time during propulsion of the vehicle, and
the predetermined period of time in the low mode is set longer than the predetermined period of time in the high mode.

9. The control system as claimed in claim 1, wherein the road surface condition includes a muddy road, a sandy road, a paved road, and a rocky road.

10. A control system that determines a road surface condition based on travelling data collected during propulsion of a vehicle, comprising:
a controller that determines the road surface condition on which the vehicle travels;
a mode changer that shift a shifting mode between:
a low mode in which a speed ratio between a prime mover and drive wheels is relatively large; and
a high mode in which the speed ratio is smaller than the speed ratio in the low mode; and
a learned model that has been built in advance based on the travelling data, the learned model is configured to:
estimate the road surface condition based on the travelling data collected during propulsion of the vehicle, the travelling data includes operational data relating to an operating amount of an operating device of the vehicle, and
determine the road surface condition based on the operational data and the travelling data collected within a predetermined period of time during propulsion of the vehicle, the predetermined period of time during propulsion of the vehicle in the low mode is set longer than the predetermined period of time during propulsion of the vehicle in the high mode,
wherein the controller is configured to determine the road surface condition based on the road surface condition estimated by the learned model.

11. The control system as claimed in claim 10, wherein the learned model was built by a supervised learning using, as training data, the travelling data which has been collected during test driving and data corresponding to the road surface condition on which the test driving was conducted.

12. The control system as claimed in claim 10, wherein the learned model is stored in the controller.

13. The control system as claimed in claim 10,
wherein the controller comprises
a transmitter that transmits the travelling data to an external device, and
a receiver that receives the road surface condition estimated by the learned model stored in the external device, and
the controller is further configured to determine the road surface condition based on the estimated road surface condition transmitted to the receiver from the external device.

14. The control system as claimed in claim 10, wherein the travelling data includes at least one of a lateral acceleration of the vehicle, a longitudinal acceleration of the vehicle, a rotational speed of a wheel of the vehicle, and an angular acceleration of the wheel of the vehicle.

15. The control system as claimed in claim 10, wherein the operational data includes at least one of an operating amount of an accelerator pedal and an estimated longitudinal acceleration of the vehicle.

16. The control system as claimed in claim 10, wherein the operational data further includes the shifting mode established by the mode changer.

17. The control system as claimed in claim 10, wherein the road surface condition includes a muddy road, a sandy road, a paved road, and a rocky road.

* * * * *